United States Patent Office 3,232,908
Patented Feb. 1, 1966

3,232,908
NONPOROUS ELASTOMERIC POLYURETHANES FROM ETHYLENE IMIDES
Harald Oertel and Heinrich Rinke, Leverkusen, Germany, assignors to Farbenfabriken Bayer Aktiengesellschaft, Leverkusen, Germany, a German corporation
No Drawing. Filed Aug. 13, 1962, Ser. No. 216,337
Claims priority, application Germany, Aug. 16, 1961, F 34,701
9 Claims. (Cl. 260—75)

This invention relates to improved nonporous elastomeric polyurethane plastics and a method of preparing the same. More particularly it relates to polyurethane fibers, films and coatings having improved elastic properties especially with regard to permanent elongation and plastic flow under load.

It has been heretofore known to react organic diisocyanates with polyhydroxy compounds having a relatively high molecular weight and chain extending agents containing active hydrogen atoms, such as glycols, diamines, hydrazine, polycarboxylic acids, polysulphydryl compounds, water and the like in solvents to thereby obtain solutions of substantially linear reaction products which form upon the removal of the solvent an elastic fiber, film or coating having high elongation and resistance to tearing. An advantage of this method is that the final configuration desired whether it be coatings, films or fibers is obtained by a simplified conventional method such as dry spinning, wet spinning, application by means of doctor blades, brushing or spraying the solution onto the desired substrate. While the elastomers obtained by these techniques especially when diamines or hydrazine are used as chain extending agents exhibit many good properties it has been found that the elastic return after elongation and the stress behavior under load are somewhat deficient for the purpose of manufacturing high grade elastic materials such as highly elastic filaments.

It is very difficult to chemically modify, more especially to introduce branches or cross-links into high molecular weight materials in solution without precipitating them. Already a few of such cross-linking bonds can have the effect that the material of high molecular weight becomes insoluble even in highly polar solvents such as dimethyl formamide or dimethyl sulphoxide. Thus, solutions result which contain jelly-like fractions or gels which solutions cannot be processed industrially.

In order to maintain the advantages of the production of polyurethane in solution and the deformability of the solution into the desired configuration and also to incorporate the best elastic properties into the final article it has been generally necessary to use a technique wherein the desired chemical change in the polymer is brought about by a treatment of the article during or after the shaping thereof.

It has also been heretofore known to polymerize polyethylene imines by heat to obtain generally hard insoluble polymers. This reaction cannot be satisfactorily supervised or controlled. When organic compounds containing active hydrogen atoms are reacted with an excess of an organic polyisocyanate and subsequently with ethylene imine, poly-N,N-ethylene ureas are obtained. These produce insoluble polymers by polymerization at high temperature and can be used as textile auxiliaries or lacquer coatings. Polyethylene imines can further be used for the finishing of cellulose woven fabrics, to impart crease resistance and other textile properties after a heat treatment. The solubility can be reduced with certain polyamides by adding larger quantities of polyethylene imines.

It is therefore an object of this invention to produce improved nonporous elastomeric polyurethane plastics. It is another object of this invention to provide improved polyurethane films, fibers and coatings. It is another object of this invention to produce polyurethane plastics having improved properties with respect to elongation set and plastic flow under load. It is still another object of this invention to provide an improved method of making polyurethane plastics having these improved properties by using solution techniques. It is a further object of this invention to provide an improved method of making polyurethane fibers, films and coatings wherein the procedural advantages of shaping from a solution are combined with improved physical properties of the final article.

The foregoing objects and others which will become apparent from the following description are accomplished in accordance with the invention generally speaking by providing highly elastic shaped polyurethane articles by mixing from about 0.01 to about 9 percent by weight based on the solid content of the solution of a compound containing at least two ethylenimide groups bonded to carbonyl, —CO—NH—, —CSNH, —CO—O, —CS—O, —SO$_2$, —C=N— groups, carbonic acid or phosphoric acid radicals to a solution of a substantially linear polyurethane polymer in a solvent wherein the polymer is substantially free of —NCO groups, shaping the solution into the desired configuration with the removal of the solvent and heating the article to a temperature of from about 80° to about 170° C. Thus, the invention contemplates the addition of the stated quantity of a compound containing at least two ethylenimide groups to a solution of the polyurethane polymer in an inert solvent after the reaction to form polyurethane polymer is substantially completed and free of —NCO groups, imparting to the solution the desired configuration to obtain a solidified polyurethane plastic by the removal of the solvent and heating the article obtained to the temperature of from about 80° to about 170° C.

In this technique the elastic properties and especially elongation set and creep are improved. Modulus, resistance to tearing and elongation of the products are generally only slightly modified. In many cases however, an increase in the modulus and resistance to tearing and a slight decrease in elongation are observed. The softening point of the elastomers is practically unaffected, the reduction of the swelling capacity or the solubility increases the practical value of the products for example, elastic filament and coatings produced according to the invention. It has been further observed that the products prepared in accordance with this invention degrade under hydrolytic aging tests much more slowly than products heretofore known in the art.

In the present process, compounds having at least two ethylenimide groups are supplied in only a subordinate quantity to the solutions of the elastic polyaddition products which no longer contain free —NCO groups. The shaped elements are obtained from solution on removal of the solvent, generally by evaporation, and are simultaneously or subsequently heated to higher temperatures.

The outstanding improvement in important elastic properties of the highly elastic products was not to be expected. Possible polymerization reactions of the added ethylenimide compounds by themselves only permitted insignificant changes in the elastic properties to be expected within the elastomeric substance. While it is not intended to rely on any specific theory as to the mechanism which takes place the appreciable improvement in important elastic properties (such as the permanent elongation and the reduction of the flow under load) due to the addition of such small quantities of ethlenimide compounds permits it to be assumed that chemical reactions have taken place, which particularly influence the elastic properties. Furthermore, the greater resistance to hydrolytic degradation, more especially of the elastic properties, in the products obtained by the process of the invention underlines the change which has occurred. The new process makes it possible for solutions of the substantially linear, elastic polyurethanes of high molecular weight to be shaped in conventional manner after adding the ethylenimide compounds and to carry out the chemical reaction causing the improved elastic properties with the heating during or after the shaping, as it still cannot be carried out in the solution for the reasons already mentioned. The products obtained by the process cannot be dissolved in conventional solvents. The process is also distinguished by its simplicity, since the polyethylene imide compounds are easy to handle and because of their good solubility, for example, in dimethyl formamide, they can be incorporated in a simple manner into the solutions without it being necessary to use expensive apparatus such as roll stands, kneading machines or mixing devices. During the reaction, no secondary products are split-off which could lead to the shaped elements being deleteriously affected.

Any suitable substantially linear polyurethane polymer may be used in the preparation of the polyurethane solvent solution to which the ethylene imide compound is added. Substantially linear polyurethane polymers are prepared in accordance with this invention by reaction of relatively high molecular weight compounds contained active hydrogen atoms as determined by the Zerewitinoff tests, which are reactive with —NCO groups with excess quantities of diisocyanates and chain extending agents containing active hydrogen atoms in quantities such that the polymer obtained will be substantially free of —NCO groups. These reaction products can be dissolved in organic polar solvents such as dimethyl formamide, dimethyl acetamide, dimethyl sulphoxide and the like with the accompanying heating of the solution up to about 80° C. where necessary or the polymers can be prepared directly in the solvents.

Any suitable organic compound containing active hydrogen atoms which are reactive with —NCO groups may be used in the preparation of the substantially linear polyurethane polymer such as, for example, hydroxyl polyesters, polyhydric polyalkylene ethers, polyhydric polythioethers, polyacetals and the like.

Any suitable hydroxyl polyester may be used such as, for example, the reaction product of a dicarboxylic acid and a dihydric alcohol. Any suitable dicarboxylic acid may be used in the preparation of the hydroxyl polyester such as, for example, adipic acid, succinic acid, sebacic acid, suberac acid, oxalic acid, methyladipic acid, glutaric acid, pimelic acid, azelaic acid, phthalic acid, terephthalic acid, isophthalic acid, thiodipropionic acid, maleic acid, fumaric acid, citraconic acid, itaconic acid, and the like. Any suitable dihydric alcohol may be used in the reaction with the dicarboxylic acid to form a polyester such as, for example, ethylene glycol, propylene glycol, butylene glycol, amylene glycol, hexanediol, bis-(hydroxymethyl-cyclohexane), and the like. Of course, the hydroxyl polyester may contain urethane groups, urea groups, amide groups, chalkogen groups and the like. Thus, the hydroxyl terminated polyester includes, in addition to hydroxyl terminated polyesters, also hydroxyl terminated polyester amides, polyester urethanes, polyetheresters, and the like. Any suitable polyester amide may be used such as, for example, the reaction product of an amine or an amino alcohol with any of the compositions set forth for preparing polyesters. Any suitable amine may be used such as, for example, ethylene diamine, propylene diamine, tolylene diamine, and the like. Any suitable amino alcohol such as, for example, β-hydroxy ethylamine and the like may be used. Any suitable polyester urethane may be used such as, for example, the reaction of any of the above-mentioned polyesters or polyester amides with a deficiency of an organic polyisocyanate to produce a compound having terminal hydroxyl groups. Any of the polyisocyanates set forth hereinafter may be used to prepare such compounds. Further, in the preparation of the polyester or polyester amide hydroxyl carboxylic acids, lactones, amino carboxylic acids, cyclic carbonates and the like may be used, such as, for example, caprolactone, caprolactams, glycine, amino-caproic acid, hydroxybutyric acid and the like.

Any suitable polyhydric polyalkylene ether may be used such as, for example, the condensation product of an alkylene oxide with a small amount of a compound containing active hydrogen containing groups such as, for example, water, ethylene glycol, propylene glycol, butylene glycol, amylene glycol and the like. Any suitable alkylene oxide condensate may also be used such as, for example, the condensates of ethylene oxide, propylene oxide, butylene oxide, amylene oxide and mixtures thereof. The polyalkylene ethers prepared from tetrahydrofuran may be used. The polyhydric polyalkylene ethers may be prepared by any known process such as, for example, the process described by Wurtz in 1859 and in the "Encyclopedia of Chemical Technology," volume 7, pages 257 to 262, published by Interscience Publishers in 1951 or in U.S. Patent 1,922,459.

Any suitable polyhydric polythioether may be used such as, for example, the reaction product of one of the aforementioned alkylene oxides used in the preparation of the polyhydric polyalkylene ether with a polyhydric thioether such as, for example, thiodiglycol, 3,3'-dihydroxy propylsulfide, 4,4'-dihydroxy butylsulfide, 1,4-(β-hydroxy ethyl) phenylene dithioether and the like. Any thioether prepared in accordance with German Patent 1,039,232 may be used.

Any suitable polyacetal may be used such as, for example, the reaction product of an aldehyde with a polyhydric alcohol. Any suitable aldehyde may be used such as, for example, formaldehyde, paraldehyde, butyraldehyde and the like. Any of the polyhydric alcohols mentioned above with relation to the preparation of hydroxyl polyesters may be used. Any of the polyacetals prepared in accordance with German Patents 1,039,444 and 1,045,095 and U.S. Patent 2,870,097 may be used in the process of this invention.

It is preferred that the organic compound containing active hydrogen atoms have a molecular weight of about 600 to about 6000 and a melting point below about 60° C. and preferably below about 45° C.

Any suitable organic diisocyanate may be used in the process of this invention for the preparation of the substantially linear polyurethane polymer such as, for example, ethylene diisocyanate, ethylidene diisocyanate, propylene diisocyanate, butylene diisocyanate, hexamethylene diisocyanate, cyclopentylene-1,3-diisocyanate, cyclohexylene-1,4-diisocyanate, cyclohexylene-1,2-diisocyanate, 2,4-tolylene diisocyanate, 2,6-tolylene diisocyanate, 4,4'-diphenylmethane diisocyanate, 2,2-diphenylpropane-4,4'-diisocyanate, p-phenylene diisocyanate, m-phenylene diisocyanate, xylylene diisocyanate, 1,4-naphthylene diisocyanate, 1,5-naphthylene diisocyanate, diphenyl-4,4'-diisocyanate, azobenzene-4,4'-diisocyanate, diphenylsulphone-4, 4'-diisocyanate, dichlorohexamethylene diisocyanate, furfurylidene diisocyanate, 1-chlorobenzene-2,4-diisocyanate and the like. It is preferred that aromatic diisocyanates be used.

The reaction of the organic compound containing active hydrogen atoms and the diisocyanate is carried out in the known manner at temperatures of from about 80° to about 130° C. either in the melt or in inert solvents such as benzene, dioxane, methylene chloride and the like. Any suitable chain extending agent containing active hydrogen atoms may be used in the preparation of the substantially linear polyurethane polymer such as, for example, glycols, diamines, hydrazines, hydrazides, bissemicarbazides, water, dicarboxylic acids, bis-mercaptans and the like; such as, for example, butane-1,4-diol, 2-butene-1,4-diol, butine-1,4-diol, hexane-1,6-diol, hexane-2,5-diol, thiodiglycol, hexahydro-xylylene-glycol, 1,4-phenylene-bis-hydroxyethylether, 1,5-naphthalene-bis-hydroxyethylether, ethylene diamine, tetramethylene-1,4-diamine, N,N'-dimethylhexamethylene-1,6-diamine, 1,4 - diamino-cyclohexane, 4,4'-diaminodiphenyl-methane, 3,3'-dichloro-, or 3,3-dimethyl-, or 3,3'-dimethoxy-4,4'-diaminodiphenylmethane, water, succinic acid, adipic acid, maleic acid, isophthalic acid, thiodipropionic acid, hydrazine or substituted hydrazines, such as N,N'-dimethylhydrazine, N,N'-diaminopiperazine, cyanethylhydrazine, hexamethylene-bis-hydrazine, or hydrazides of dicarboxylic acids, sulphonic acids and carbonic acid, such as carbodihydrazide, adipic acid dihydrazide, isophthalic acid dihydrazide, thiodipropionic acid hydrazide, 1,3-phenylenedisulphonic acid dihydrazide, and also bis-semicarbazides such as ethylene-, tetramethylene- or hexamethylene-bis-semicarbazides, and esters of hydrazine-carboxylic acid with glycols, such as butanediol, ethylene glycol or the bis-hydroxyethylether of hydroquinone and the like.

The chain extending agent may be reacted either simultaneously with the organic compound containing active hydrogen atoms and the organic diisocyanate of the active hydrogen containing compound and the diisocyanate may be first reacted to form an —NCO terminated prepolymer and this prepolymer then reacted with the chain extending agent. In either instance, the chain extending agent is used in an amount such that substantially no free —NCO groups are present in the substantially linear polyurethane polymer. Further, because of the high reaction velocity of aliphatic diamines and hydrazide compounds with —NCO groups, it is preferred when such compounds are used to conduct the reaction in a solvent. With the other chain extending agents such as glycol, for example the reaction can take place in the melt and then the solution prepared by dissolving the polymer in a suitable solvent.

As stated previously, the reaction to form the substantially linear polyurethane polymer may be conducted in a solvent from which the final article is to be shaped by removing the solvent. For this purpose organic polar solvents with the capacity of forming hydrogen bridge bonds can be used, such as, for example, those carrying amide or sulphoxide groups such as dimethyl formamide, dimethyl acetamide, diethyl formamide, dimethyl propionamide, dimethylsulphoxide, N-methyl-pyrrolidone, amides of phosphoric acids and phosporamide and the like. Further, other solvents which are neutral with respect to isocyanate groups can concurrently be used in subordinate quantities such as, for example, dioxane, tetrahydrofuran, glycol monomethylether acetate, di-n-butylether, cyclohexanone, benzene, chlorobenzene and the like.

The polyethylenimide compounds can be added to the substantially linear polyurethane polymer solvent solution either in a solid or in a dissolved condition. It is preferred however, that the polyethylenimide compound be added in the dissolved condition. Further, when highly reactive chain extending agents such as diamines, hydrazine or hydrazide derivatives are used, the polyethylenimides can be incorporated into the solution of the isocyanate-modified active hydrogen containing compound before the reaction with the chain extending agent.

When suitable polyethylenimide compounds which contains the radical

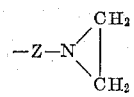

at least twice the molecule where Z represents a carbonyl, thiocarbonyl or a CO—NH, CS—NH, COO, CSO, SO$_2$, or C=N groups, it being possible for the latter to be in a heterocyclic system, such as perhaps the triazine radical. Ethylene imides of phosphoric and carbonic acids are also compounds which can be used according to the invention. The ethylene imide radical can also carry substituents, such as alkyl, aryl or alkoxy groups, on the carbon atoms, and these for the purpose of this invention are considered equivalents of that represented in the formula. Such compounds containing the ethylenimide group at least twice the radical can be obtained by reacting ethylenimine with organic diisocyanates, organic diisothiocyanates, phosphoric acid, cyanuric acid, chlorides, polycarboxylic acids such as, for example, those mentioned previously in the preparation of the hydroxy polyesters, polysulphonic acids and the like.

The polyureas of diisocyanates and ethylene imine have proved especially suitable, for example, those of hexamethylene or tetramethylene diisocyanate, phenylene-1,4-diisocyanate, diphenyl methane-4,4'-diisocyanate, diphenyl-4,4'-diisocyanate with ethylene imine or ethylene imines which are alkyl-or aryl-substituted on the carbon atom of the ethylene imine ring, for example, C-methyl-ethylene imine. The corresponding thioureas of thioisocyanates and possibly substituted ethylene imines are equally suitable. The carbonyl-bis-ethylene imide, phosphoric acid-tris-ethylene imide, monophosphoric acid ester-bis-ethylene imides, as well as the ethylene imide of cyanuric acid chloride and ethylene imine, and the ethylene imides of polycarboxylic acids (such as succinic, adipic, isophthalic, fumaric and benzene-1,3,5-tricarobxylic acids) and ethylene imides of polysulphonic acids (such as hexamethylene-bis-sulphethylene imide, and benzene-1,3- and 1,4-disulphethylene imide) are substances which can be used according to the invention. The N,N-ethylene-bis-ureas according to German specification No. 1,112,286 are also suitable compounds.

The quantity of ethylene imides to be added according to the invention depends on the molecular weight and functional capacity thereof and is between 0.01 and 9 percent by weight and preferably from about 0.5 to about 3 percent by weight based on the solid content of the solution. Higher quantities, for example greater than 10 percent by weight in most cases have a detrimental effect on the elastic properties, and in particular the modulus becomes very high and the resistance to further tearing of the products falls to a considerable degree.

The heat treatment during or after the shaping is effected at 80° to 170° C. and depends as regards duration and exact temperature on the reactivity of the ethylene imide and of the reaction product treated therewith.

The reaction velocity can be increased by adding small quantities (0.0 to 1 percent) of substances having an acid reaction. For example, carboxylic acids or sulphonic acids, sulphonic acid imides and tricyanoethylene have an accelerating action.

Particularly outstanding improvements are obtained with shaped elements which are prepared with diamines, hydrazines or hydrazide compounds as chain extenders and therefore these are the most preferred.

The highly elastic shaped elements, such as can be obtained in the form of fibers, films or coatings by the new process are suitable for many purposes of use. On account of the high elasticity and small permanent elongation, outstanding resistance to solvents and resistance to abrasion, the elastic filaments are suitable for the manufacture of elastic woven fabrics, more especially corsets and the like, with a high restoring force. Elastic films can also be used as such, or after curing to form filaments. Furthermore, elastic coverings and coatings which are resistant to solvents and have extraordinarily good bonding power are obtained on woven fabrics by using the process.

The invention is further illustrated but not limited by the following examples, in which parts are by weight unless otherwise specified.

EXAMPLE 1

*Preparation of the solution as starting material*

About 1400 parts of a polyester of ethylene glycol and adipic acid having a molecular weight of 2000 are mixed with a solution of 292 parts of distilled diphenylmethane-4,4'-diisocyanate in about 400 parts of benzene at about 45° C. and, after distilling off the solvent in vacuum, are heated for about 2 hours to about 97°. The melt has an —NCO content of 2.19% and is stirred with about 1690 parts of anhydrous dimethyl formamide to give a solution with about 1.0% of free —NCO groups. A solution of about 35.1 parts of carbodihydrazide in about 351 parts of water and about 6190 parts of dimethyl formamide is poured in while stirring vigorously. The viscous solution (63 P./20°) thereby obtained shows a concentration of about 17.2 percent and is pigmented with $TiO_2$ (5%, calculated on solid content). By means of a liquid film evaporator, the solution is concentrated at 70°/12 mm. Hg to a solid content of 25.7% with a viscosity of 387 P./20° C.

A part of the solution has added thereto about 1 percent based on the solid content of 1,6-hexamethylene-bis N,N'-ethylene urea prepared from hexamethylene diisocyanate and ethylene imine at room temperature. By means of a casting device, the solution is cast on glass plates as films and left for about 30 minutes at about 70° C. and about 30 minutes at about 100° C. in a drying chamber. After detaching, the film is left hanging freely in the drying chamber for about 30 minutes at about 140° C. If the film is heated on the glass plate to the same temperature, a very strong adhesion with the support is obtained. The films with a thickness of from about 0.17 to about 0.21 mm. are cut by means of a suitable cutting device into filaments and show the following properties: the values without addition of bis-ethylene imide are given for comparison purposes.

|  | Bis-ethylene imide | |
| --- | --- | --- |
|  | Without | With |
| Count (den.) | 880 | 780 |
| Tensile strength, g./den | 0.53 | 0.60 |
| Tensile strength (breaking count) | 5.1 | 5.1 |
| Breaking elongation, percent | 860 | 750 |

The permanent elongation is measured by clamping the filaments between two clamps at a spacing of 50 mm., stretching them to the required degree and relieving the tension after 10 minutes' elongation, the measurements being made immediately and also 30 seconds and 60 seconds after relieving the tension.

|  | 100% | 200% | 300% | 400% |
| --- | --- | --- | --- | --- |
| Without additive: | | | | |
| Immediately | 10.3% | 16.5% | 19.5% | 34% |
| 30 sec | 6.0% | 6.4% | 16.3% | 33% |
| 60 sec | 5.7% | 6.0% | 15.6% | 31% |
| With additive: | | | | |
| Immediately | 5.5% | 12.1% | 16.2% | 25.8% |
| 30 sec | 3.7% | 4.8% | 11.1% | 17.4% |
| 60 sec | 2.3% | 3.9% | 10.0% | 16.3% |

With dynamic hysteresis measurements, it is found that after being stretched three times to 300% and subsequently relieved of tension, each time with a speed of 400%/min., the modulus in the filament with an addition of bis-ethylene imide shows a decrease in tension smaller by 10% and that the moduli at 150° C. with repeated stretching are higher.

After a washing test, represented by 30 washing operations of 10 minutes at 80° C. in a washing liquor containing 4 g./l. of a neutral detergent ("Dixan," sold by Henkel, Dusseldorf) the permanent elongation after stretching three times to 300% at a speed of 400%/min. deteriorates from 16% to 32% after relieving the tension and waiting for 30 seconds, whereas the filament treated with the bis-ethylene imide compound shows only 15% permanent elongation after the washing operation.

|  | Washing test | |
| --- | --- | --- |
|  | Before | After |
| Without additive: | | |
| Tensile strength, g./den | 0.53 | 0.43 |
| Elongation, percent | 860 | 750 |
| Permanent elongation, percent | 18 | 32 |
| With additive: | | |
| Tensile strength, g./den | 0.60 | 0.57 |
| Elongation, percent | 740 | 750 |
| Permanent elongation, percent | 12 | 15 |

Filaments or films which are cast from solutions with addition of the 1,6-hexamethylene-bis-N,N'-ethylene urea, but which are not subjected to any thermal after treatment at elevated temperatures, show the same properties as films or filaments without the additive. Like the latter, they are soluble in dimethyl formamide at room temperature, whereas the film subjected to heat treatment becomes insoluble.

EXAMPLE 2

An elastomer solution prepared as in Example 1, with about 25.9% of solid substance and a viscosity of 386 P./20° C. with about 5.7% of $TiO_2$, has added thereto about 2.5% of 1,6-hexamethylene-bis-N,N'-ethylene urea (calculated on the solid substance), dissolved in a little warm dimethyl formamide, and is shaped to form elastic filaments by the dry-spinning process. For this purpose, the solution is spun at a delivery rate of 4.5 ml./min. through a spinneret with 8 apertures, each with a diameter of 0.20 mm., into a heated shaft (170° C.) with an ascending air current at 220° C., the filament is withdrawn at 100 m./min. and wound after passing through a talcum bath.

Some of the spools are heated for about 30 minutes to about 135° C. The comparison thereof with spools without final heating and with filaments which are spun from the solution under the same conditions but without addition of the ethylene imide compound, shows the following result:

|  | Without additive | With additive |
| --- | --- | --- |
| Count | 122 | 122 |
| Tensile strength (g./den.) | 0.60 | 0.64 |
| Elongation (percent) | 733 | 715 |
| Permanent elongation (300%): | | |
| 1. 1st cycle | 6 | 4 |
| 2. 2nd cycle | 10 | 6 |
| 3. 3rd cycle | 12 | 8 |
| 30" after relief of tension | 8 | 4 |

The permanent elongation is measured in each case immediately after the elongation/relaxation cycle (speed of the elongation or relaxation 400%/min.), and also after the relaxation with a relaxation time of 30 seconds after the third cycle.

The filaments with addition of 1,6-hexamethylene-bis-

N,N'-ethylene urea can also be thermally aftertreated in hot baths. The spools are placed for about 4 minutes in glycerine in a temperature of about 120° C. and, after the heat treatment, are washed with cold water and dried. The same treatment in glycerine at about 160° C. leads in a shorter time (one minute) to the same result, as shown by the insolubility which occurs.

The fiber coalescing point obtained by heating the fiber on the microscope and with constant testing of the capacity for coalescing by means of a thin glass rod is 186° to 187° C. with both the fibers having the addition of 1,6-hexamethylene-bis-ethylene imide urea and those without the said additive.

It is of course to be understood that any of the active hydrogen containing compounds, organic diisocyanates, chain extenders or ethylene imide compounds may be utilized throughout the examples for the specific compounds utilized therein and that the scope of the invention is not to be limited by the examples presented herein.

Although the invention has been described in considerable detail for the purpose of illustration, it is to be understood that variations can be made by those skilled in the art without departing from the spirit of the invention and the scope of the claims.

What is claimed is:

1. A process for preparing elastomeric polyurethane plastics which comprises mixing a solution of a substantially linear polyurethane polymer being substantially free of —NCO groups in a polar solvent therefor with the capacity of forming hydrogen bridge bonds with from about 0.01 to about 9% by weight based on the solid content of the solution of a compound containing at least two ethylene imide groups and being free of groups reactive with NCO groups imparting the desired configuration to said solution by removal of the solvent and heating the article thus formed to a temperature of from about 80° to about 170° C.

2. A process for preparing elastomeric polyurethane plastics which comprises mixing a solution of a substantially linear polyurethane polymer being substantially free of —NCO groups in a polar solvent therefor with the capacity of forming hydrogen bridge bonds with from about 0.01 to about 9% by weight based on the solid content of the solution of a compound having the group

at least twice in the molecule and prepared by reacting ethylenimine with a member selected from the group consisting of organic diisocyanates, organic diisothiocyanates, phosphoric acid, carbonic acid esters, cyanuric acid halides, polycarboxylic acids and polysulphonic acids, imparting the desired configuration to said solution by removal of the solvent and heating the article thus formed to a temperature of from about 80° to about 170° C.

3. A process for preparing elastomeric polyurethane plastics which comprises mixing a solution of a substantially linear polyurethane polymer being substantially free of —NCO groups and prepared by reacting an organic compound containing active hydrogen atoms which are reactive with —NCO groups and having a molecular weight of at least about 600 with an organic diisocyanate and a chain extending agent containing active hydrogen containing groups selected from the group consisting of hydroxyl, amino, mercapto and carboxylic acid groups in a polar solvent therefor with from about 0.01 to about 9% by weight based on the solid content of the solution of a compound containing at least two ethylene imide groups and being free of groups reactive with NCO groups imparting the desired configuration to said solution by removal of the solvent and heating the article thus formed to a temperature of from about 80° to about 170° C.

4. A process for preparing elastomeric polyurethane plastics which comprises mixing a solution of a substantially linear polyurethane polymer being substantially free of —NCO groups and prepared by reacting an organic compound containing active hydrogen atoms which are reactive with —NCO groups and having a molecular weight of at least about 600 with an organic diisocyanate and a chain extending agent containing active hydrogen containing groups selected from the group consisting of hydroxyl, amino, mercapto and carboxylic acid groups in a polar solvent therefor with the capacity of forming hydrogen bridge bonds with from about 0.01 to about 9% by weight based on the solid content of the solution of a compound having the group

at least twice in the molecule and prepared by reacting ethylenimine with a member selected from the group consisting of organic diisocyanates, organic diisothiocyanates, phosphoric acid, carbonic acid esters, cyanuric acid halides, polycarboxylic and polysulphonic acids, imparting the desired configuration to said solution by removal of the solvent and heating the article thus formed to a temperature of from about 80° to about 170° C.

5. A process for preparing elastomeric polyurethane plastics which comprises mixing a solution of a substantially linear polyurethane polymer being substantially free of —NCO groups and prepared by reacting an organic compound containing active hydrogen atoms which are reactive with —NCO groups and selected from the group consisting of hydroxyl polyesters, prepared by the process which comprises reacting a dihydric alcohol with a dicarboxylic acid, polyhydric polyalkylene ethers, polyhydric polythioethers and polyacetals, and having a molecular weight of at least about 600 with an organic diisocyanate and a chain extending agent containing active hydrogen containing groups selected from the group consisting of hydroxyl, amino, mercapto and carboxylic acid groups in a polar solvent therefor with the capacity of forming hydrogen bridge bonds with from about 0.01 to about 9% by weight based on the solid content of the solution of a compound having the group

at least twice in the molecule and prepared by reacting ethylenimine with a member selected from the group consisting of organic diisocyanates, organic diisothiocyanates, phosphoric acid, carbonic acid esters, cyanuric acid halides, polycarboxylic and polysulphonic acids, imparting the desired configuration to said solution by removal of the solvent and heating the article thus formed to a temperature of from about 80° to about 170° C.

6. The process of claim 3 wherein the compound containing the group

is the reaction product of ethylenimine and an organic polyisocyanate.

7. The process of claim 3 wherein the compound containing two ethylenimide groups is 1,6-hexamethylene-bis-N,N'-ethylene urea.

8. The process of claim 5 wherein the organic compound containing active hydrogen atoms has a molecular weight of from about 600 to about 6000 and a melting point less than 60° C.

9. The product prepared by the process of claim 5.

(References on following page)

References Cited by the Examiner

UNITED STATES PATENTS

| | | | |
|---|---|---|---|
| 2,360,192 | 10/1944 | Bestian | 260—75 |
| 2,582,594 | 1/1952 | Kropa et al. | 260—2 |
| 2,677,681 | 5/1954 | Gill | 260—2 |
| 2,725,385 | 11/1955 | Seeger et al. | 260—77.5 |
| 2,830,045 | 4/1958 | Leumann et al. | 260—2 |
| 2,917,486 | 12/1959 | Nelson et al. | 260—77.5 |
| 2,929,800 | 3/1960 | Hill | 260—77.5 |

FOREIGN PATENTS 3,054,754   9/1962   Great Britain.

LEON J. BERCOVITZ, *Primary Examiner.*